H. D. BOYER.
GREASE CUP.
APPLICATION FILED OCT. 17, 1914. RENEWED JAN. 18, 1919.

1,304,537.

Patented May 27, 1919.
3 SHEETS—SHEET 1.

Harrison D. Boyer
Inventor

Witnesses

By W. W. Williamson
Attorneys

H. D. BOYER.
GREASE CUP.
APPLICATION FILED OCT. 17, 1914. RENEWED JAN. 18, 1919.
1,304,537.
Patented May 27, 1919.
3 SHEETS—SHEET 2.
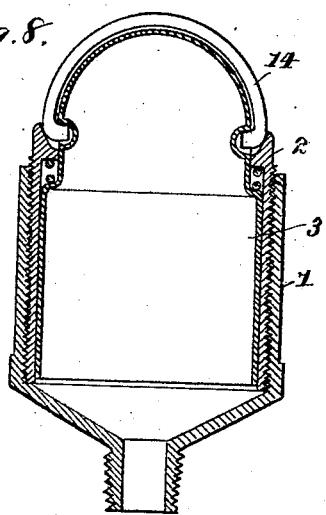
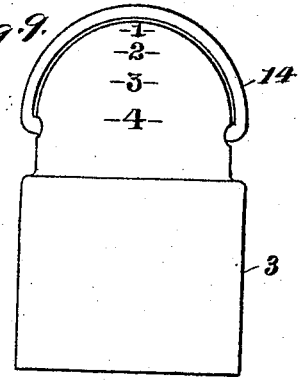
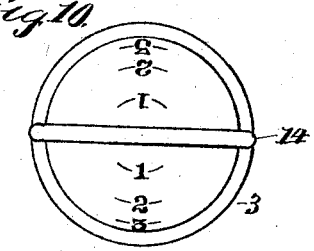
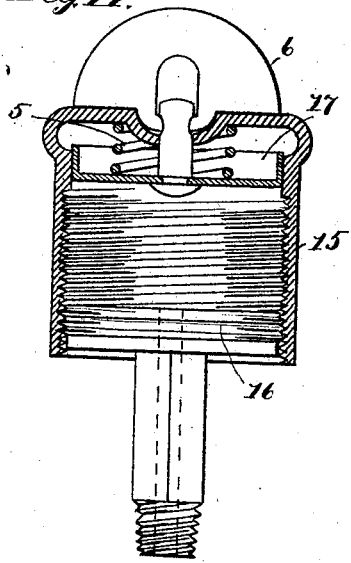
Witnesses
A. Williamson
H. W. Burton
Harrison D. Boyer
Inventor
By W. W. Williamson
Attorneys H. D. BOYER.
GREASE CUP.
APPLICATION FILED OCT. 17, 1914. RENEWED JAN. 18, 1919.
1,304,537.
Patented May 27, 1919.
3 SHEETS—SHEET 3.
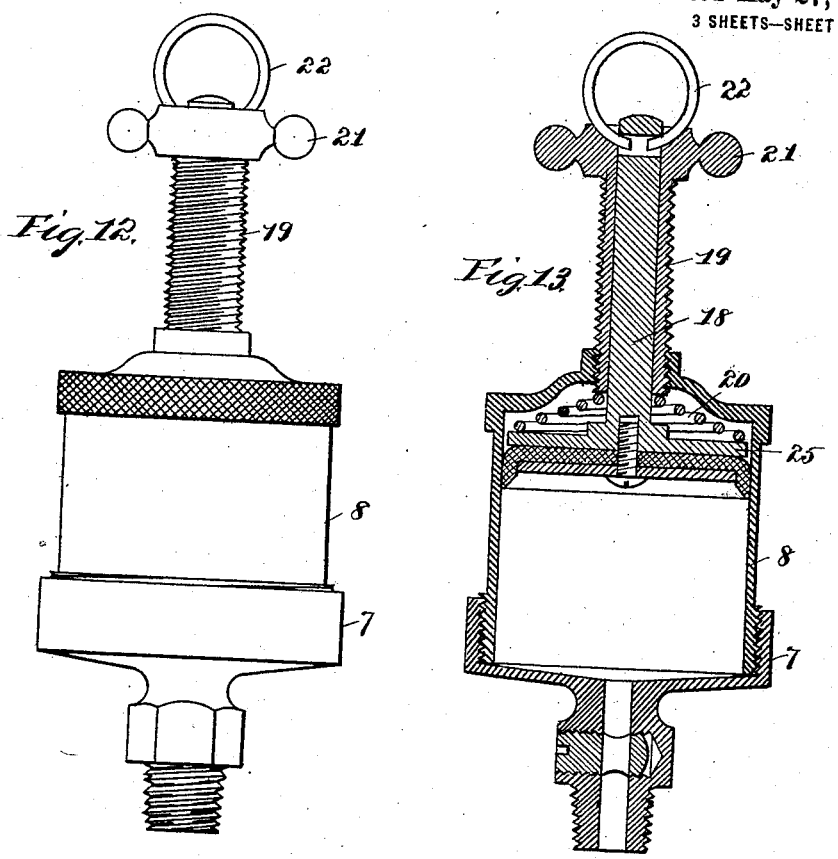
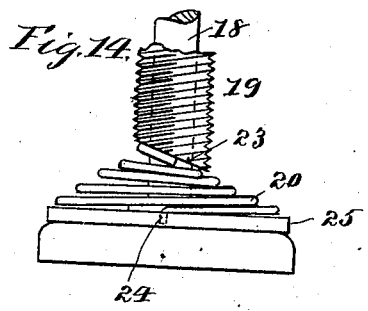
Witnesses
T. J. Williamson
H. W. Burton
Harrison D. Boyer
Inventor
By
W. W. Williamson
Attorneys

UNITED STATES PATENT OFFICE.

HARRISON D. BOYER, OF PHILADELPHIA, PENNSYLVANIA, ASSIGNOR, BY MESNE ASSIGNMENTS, TO LEANDER W. RIDDLE, OF GLEN RIDDLE, PENNSYLVANIA.

GREASE-CUP.

1,304,537.  Specification of Letters Patent.  Patented May 27, 1919.

Application filed October 17, 1914, Serial No. 867,145. Renewed January 18, 1919. Serial No. 271,912.

*To all whom it may concern:*

Be it known that I, HARRISON D. BOYER, a citizen of the United States, residing at Philadelphia, in the county of Philadelphia and State of Pennsylvania, have invented new and useful Improvements in Grease-Cups, of which the following is a specification.

My invention relates to new and useful improvements in grease cups, or that class of lubricators designed to feed a non-fluid lubricant to journal bearings and the like, especially to that class of such grease cups as utilize a plunger for forcing the grease into the bearing and consists primarily in connecting a signaling semaphore with the plunger, and so arranging the parts that said semaphore will remain out of signal position during the feeding of the grease and be thrown into signal position just prior to the end of the stroke of the plunger.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawings forming a part of this specification, in which—

Fig. 8, is a central vertical section of a grease cup designed to weigh the pressure upon the grease.

Fig. 9 is a detail elevation of the plunger shown in Fig. 8, the semaphore being attached thereto.

Fig. 10 is a plan view of Fig. 9.

Fig. 11, is a still further modification of my improvement.

Fig. 12, is a side elevation of a further modification of my improved grease cup.

Fig. 13, is a central vertical section of Fig. 12; and

Fig. 14, is a detail view showing the means utilized for preventing the accidental backing off of the feed screw.

Figure 1:
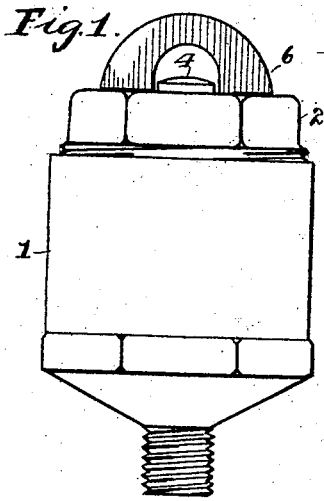
Figure 1, is an elevation of one design of my improved grease cup.
Figure 2:
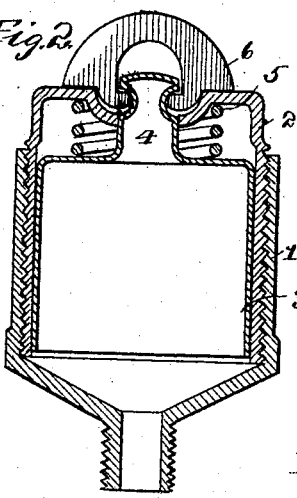
Fig. 2, is a central vertical section thereof, showing an air trap plunger.
Figure 3:
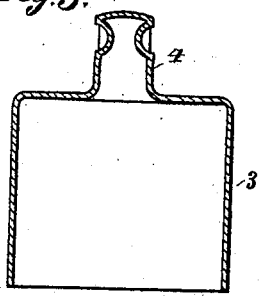
Fig. 3, is a vertical section of the plunger.
Figure 4:
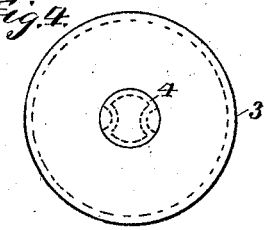
Fig. 4, is a plan view of the plunger.

In carrying out my invention as illustrated in Figs. 1 to 4 inclusive, 1 represents the lower member or body of the grease cup, while 2 represents the upper member or cap, the latter being threaded into the former. Within the cap is fitted the plunger 3, so as to slide therein, and this plunger is hollow having a stem 4 formed therewith. Above the plunger is located a spring 5 which tends to force said plunger downward, this downward movement being limited by the semaphore 6 which is pivoted to the stem as clearly shown in Fig. 2. These parts are so related to each other that when the plunger is forced inward against the action of the spring, the semaphore will fall out of the signal position, but as the plunger nears the limit of its stroke, this semaphore will be thrown into signal position as clearly shown in Fig. 2. The plunger being hollow, will trap the air contained therein, while the cap is screwed within the body, and as this cap is screwed down against the grease contained in the body, the air in the plunger will be compressed until this pressure overbalances the tension of the spring, when the plunger will be forced upward and the semaphore will fall out of signal position as the grease is fed by the air pressure within the plunger which pressure will gradually decrease until the tension of the spring is sufficient to force the plunger downward, thereby throwing the semaphore into signal position, which gives warning that the cap is to be screwed into the body to reëstablish sufficient air pressure to properly feed the grease.

Figure 5:
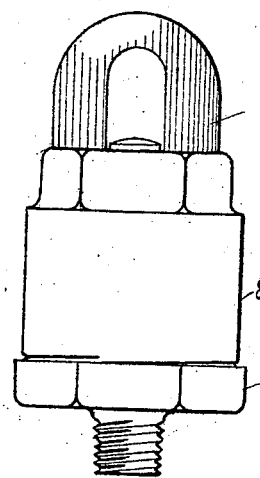
Fig. 5 is an elevation of a slightly modified form of grease cup.
Figure 6:
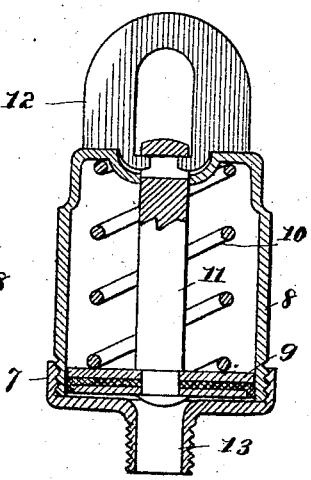
Fig. 6 is a central vertical section of Fig. 5 showing the plunger at the end of its stroke, whereby the semaphore is set in signal position.
Figure 7:
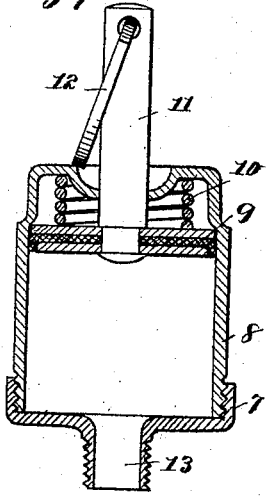
Fig. 7 is a view similar to Fig. 6, at right angles thereto, showing the plunger at the initial end of its stroke, and the semaphore utilized as a stroke to hold the plunger in this position.

In Figs. 5, 6 and 7 I have shown a form of cup in which the cup is supplied with grease by filling the cap instead of the body, and in this form of cup it is necessary to lock the plunger in its elevated position against the action of its spring in order that the cap may be filled with grease without the latter being ejected therefrom, during the filling operation, and in this construction 7 represents the bottom member which is only deep enough to receive the threaded end of the cap 8, the bottom being internally threaded for that purpose. In the cap is fitted the plunger 9 so as to slide therein and having a spring 10 interposed between it and the top of the cap so as to force said plunger outward.

A stem 11 carried by the plunger projects through the top of the cap and has pivoted thereto the semaphore 12, and this semaphore is of such proportions that when the plunger is drawn to its inner limit, it may be locked into this position by swinging the semaphore to the position shown in Fig. 7 where it serves as a lock to hold the plunger against the action of its spring. When the parts are in this position the cap may be unscrewed from the bottom and filled with grease, after which it may be replaced upon the bottom and the plunger released by the semaphore being swung out of its locked position. When this has been done the spring will cause the plunger to exert sufficient pressure upon the grease contained in the cup to force the latter through the opening 13 to the journal bearing, and when all of the grease has been expelled the semaphore will be thrown to its signal position as shown in Figs. 5 and 6.

In Figs. 8, 9 and 10 I have shown a slight modification of the construction shown in Figs. 1 to 4 inclusive, in which the body 1 is the same in design, while the cap or upper member 2 is left open at the top and the plunger 3 projects through the top of the cap, and has thereon a series of numbers here shown as from one to 4 inclusive over which the semaphore 14 swings, said semaphore being in the form of a bail pivoted to the plunger, and by the movement of this semaphore over the numbers upon the top of the plunger, the pressure upon the grease may be determined as will be readily understood.

Above the plunger 3 is located a spring 5 one end of which rests against the upper member or cap 2 of the grease cup as the stationary member, while the other end coacts with the plunger 3 as the movable member and tends to force said plunger downward or outward with relation to the cap 2, thereby forcing the grease from the cup, which action causes the semaphore to move over the numbers upon the top of the plunger as above described.

In Fig. 11 I have shown a construction of grease cup, in which the cap 15 threads over the bottom 16, and in which a short stroke plunger 17 is utilized, having the semaphore 6 operated in the same manner as described in connection with Figs. 1 to 4; and in this construction the grease may be forced into the journal bearing by screwing down the cap irrespective of the action of the plunger, but when the cap is released the plunger will thereafter continue the feeding of the grease throughout its short stroke at the end of which the semaphore will be thrown to signal position, indicating that the cap must again be set up. This style of grease cup is especially adapted for automobile use and as a vehicle hub cap.

In Figs. 12, 13 and 14 I have shown a slight modification over the construction shown in Figs. 5 to 7, in which the stem 18 of the plunger passes slidingly through a hollow and exteriorly threaded rod 19, the lower end of the latter bearing against the spring 20, so as to not only utilize the spring action on the plunger, to actuate it by its spring-propelled carrying stem, which is slidable within the hollow rod, but, as an alternative and additional means when found desirable, to force the plunger downward independent of the spring action, the exteriorly threaded rod 19 co-acting, for that purpose, with the interiorly threaded aperture in the top of the cup member.

21 is a handle carried by the threaded rod 19 for operating the latter and 22 represents the semaphore which is pivoted to the stem 18, and will be thrown to signal position when the plunger is forced to its lower limit relative to the threaded rod, and will swing out of signal position when the plunger is forced upward against the action of the spring.

In order that the threaded rod 19 may be held against accidental rotation or be backed off from any set position by the reaction of the spring, the lower end of this threaded rod is so cut as to form an inclined plane 23 against which the upper end of the spring bears as clearly shown in Fig. 14, thus permitting the threaded rod to be turned when sufficient force is applied to the handle 21, but holds it against accidental rotation, and to guard against the spring turning by the rotation of the threaded rod, the lower end of the spring is inserted in a small hole 24 of the plunger 25.

While I have shown and described these various designs of grease cups as standing in a vertical position, it is obvious that all of these designs except those shown in Figs. 1 and 8 may be used in a horizontal position or at any desired angle, which is often found necessary in practice.

Of course I do not wish to be limited to the exact details of construction as here shown, as these may be varied within the limits of the appended claims without departing from the spirit of my invention.

Having thus fully described my invention, what I claim as new and useful, is—

1. A lubricator comprising a cap, an air trapping plunger adapted to slide in this cap, a spring for forcing the plunger downward, and a semaphore connected with the plunger so as to normally lie out of signal position and be thrown into signal position at the end of the stroke of the plunger by coöperation with the cap.

2. A lubricator comprising a cap, an air trapping plunger fitted to slide in said cap, a spring adapted to force the plunger downward, a stem passing through the cap, a semaphore pivoted to the stem and adapted to fulcrum upon the cap in being thrown to signal position by the outward movement of the plunger.

3. A lubricator comprising a cap, a plunger fitted to slide therein, a spring adapted to force the plunger downward, a stem projecting from the plunger through the cap, and a semaphore pivoted to the stem adapted to fulcrum upon the cap in being thrown to signal position by the outward movement of the plunger as specified.

4. The combination of a lubricator cap, a plunger fitted to slide therein and having numbers on the top thereof, a spring adapted to force the plunger in one direction, a semaphore pivoted to the plunger and coöperating with the cap and adapted to swing over the top of the latter and move across the numbers thereon, so as to determine the pressure exerted by the plunger upon the lubricant.

5. In a lubricator a cap, an air trapping plunger fitted to slide in said cap and having numbers thereon, a spring adapted to force the plunger in one direction, and a semaphore pivoted to the plunger adapted to swing across the numbers so as to indicate the pressure in the plunger by coöperation with the cap.

6. In a lubricator the combination of a cap, an air trapping plunger fitted to slide within the cap and projecting through the top of the same, said plunger having numbers located upon the top thereof, a semaphore pivoted to the plunger and adapted to swing across said numbers for indicating the pressure within the plunger by coöperation with the cap, and a spring for forcing the plunger in one direction.

7. A lubricator comprising a cap, a plunger adapted to slide in said cap, a spring for forcing the plunger outward, and a semaphore connected with the plunger so as to normally lie out of signal position and be thrown into signal position at the end of the stroke of the plunger.

8. A lubricator comprising a cap, a plunger adapted to slide in said cap, and a semaphore connected with the plunger so as to normally lie out of signal position and be thrown into signal position at the end of the stroke of the plunger by coöperation with the cap.

9. A lubricator having a plunger mounted therein and having a portion thereof projecting through the lubricator, and a semaphore pivoted to the outer end of said projecting portion so as to normally lie out of signal position and means coacting with the semaphore to raise it to signal position at the end of the stroke of the plunger.

In testimony whereof, I have hereunto affixed my signature in the presence of two subscribing witnesses.

HARRISON D. BOYER.

Witnesses:
 M. E. HAMER,
 M. TOBIAS.

Copies of this patent may be obtained for five cents each, by addressing the "Commissioner of Patents, Washington, D. C."